United States Patent
Frentzel

[11] 3,951,054
[45] Apr. 20, 1976

[54] MEAT SLICER

[75] Inventor: Herman E. Frentzel, Kentfield, Calif.

[73] Assignee: Collins Foods International, Inc., Los Angeles, Calif.

[22] Filed: Sept. 24, 1974

[21] Appl. No.: 508,798

[52] U.S. Cl. ............................ 99/538; 99/537; 99/593; 99/594
[51] Int. Cl.² .............. A22C 17/00; A22C 17/02; A22C 17/12
[58] Field of Search ............ 99/537, 538, 593, 594; 83/451, 471.2, 483, 488, 703, 704

[56] References Cited
UNITED STATES PATENTS

| | | | |
|---|---|---|---|
| 1,014,595 | 1/1912 | Hand | 99/593 |
| 2,599,328 | 6/1952 | Hoenselaar | 99/537 X |
| 3,153,436 | 10/1964 | Chesley | 99/538 |

Primary Examiner—Billy J. Wilhite
Assistant Examiner—James A. Niegowski
Attorney, Agent, or Firm—Jessup & Beecher

[57] ABSTRACT

A spiral meat slicer especially for cutting ham, wherein the ham is mounted vertically on a spiked platform which slowly revolves. A rotating disk blade is brought into engagement with the periphery of the ham to cut the ham to the bone. The blade support is mounted on a lead screw so that the blade steadily rises as the ham rotates. Thus an unbroken spiral cut of ham is produced. In order to permit selective manual control when cutting around the aitch bone, a manually manipulatable arm is provided, by which the blade may be selectively moved toward and away from the rotative axis of the ham. Once the aitch bone has been cleared, the arm is detented into an extreme position and thereafter the blade is automatically biased toward the ham with a predetermined spring force, by means of a biasing spring. When the arm causes the blade to swing completely free of the ham to its extreme retracted position, a fractional nut disengages from the lead screw and allows the blade support to drop by gravity to its starting position at the base.

10 Claims, 13 Drawing Figures

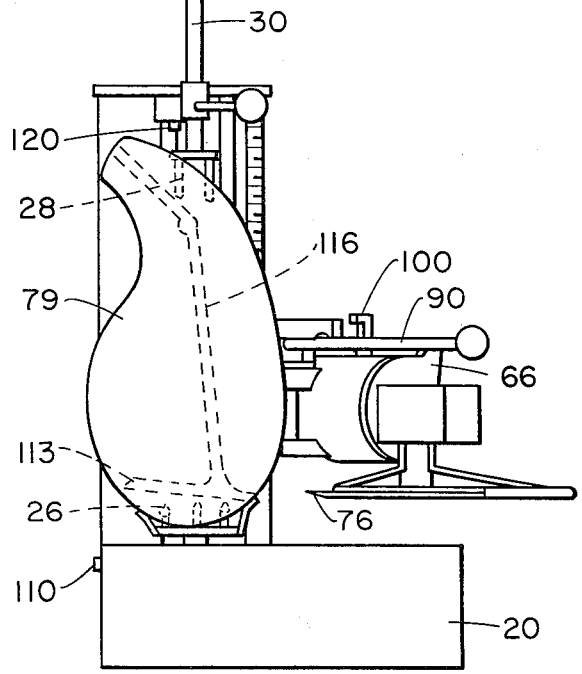
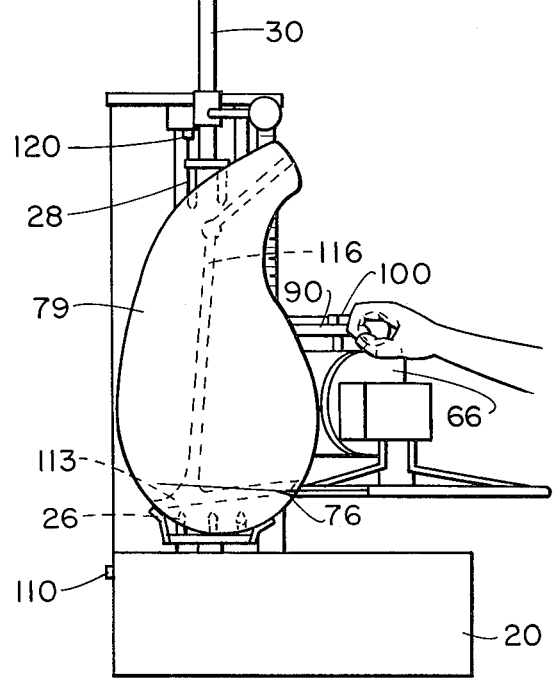
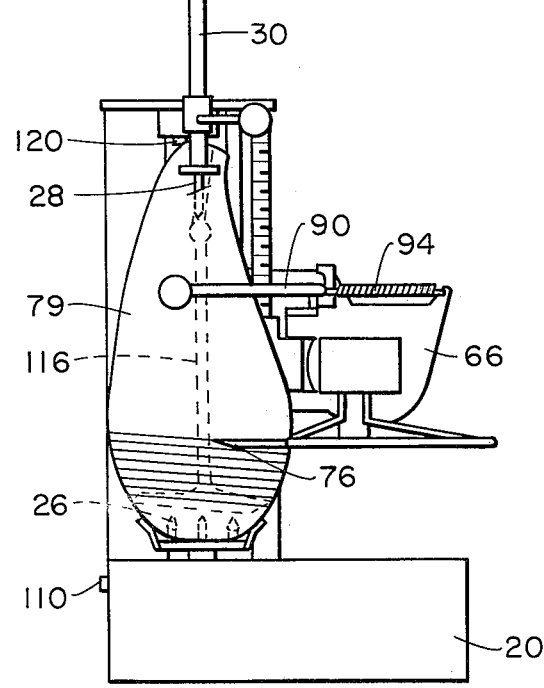
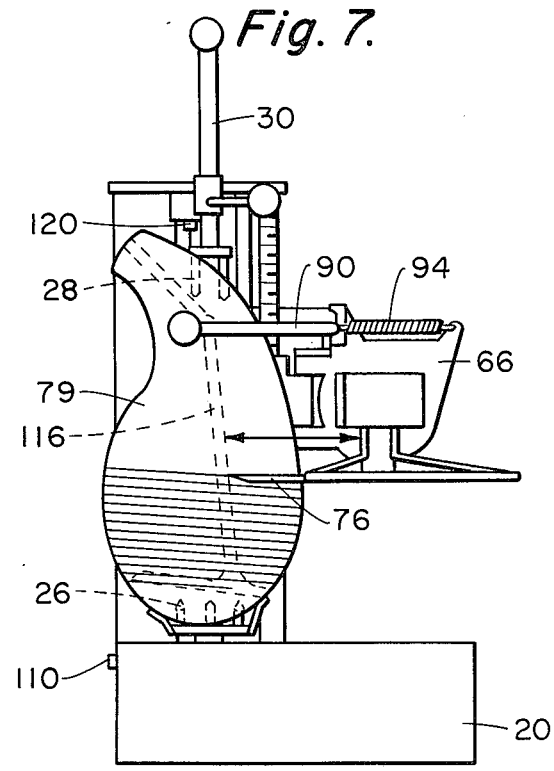

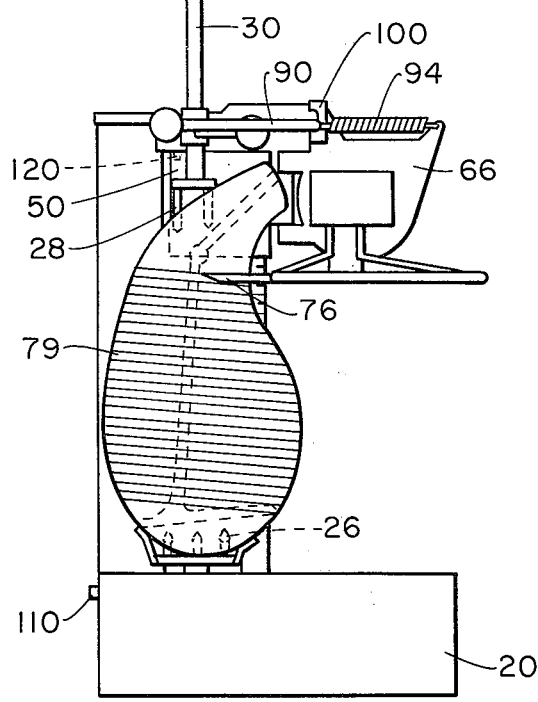
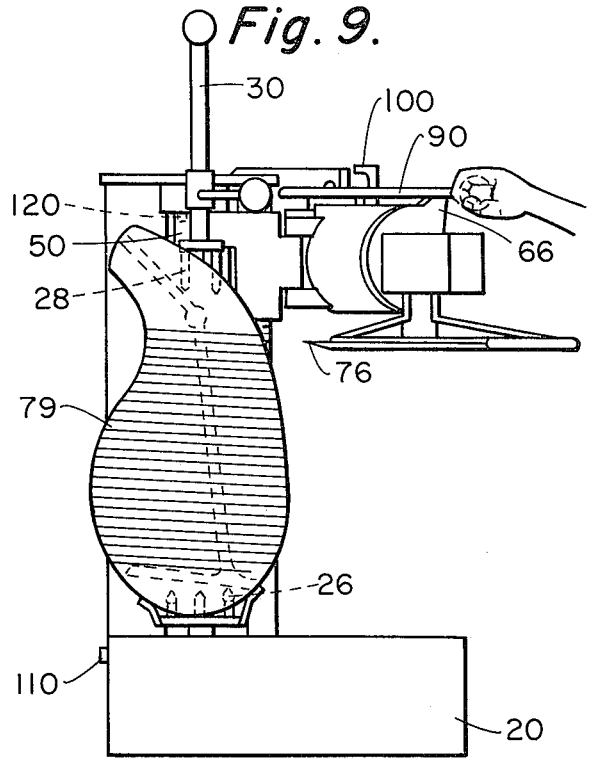
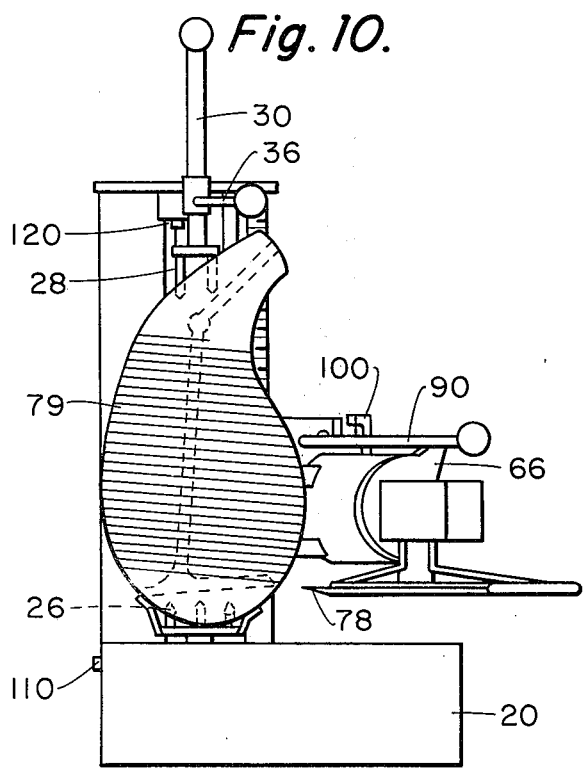
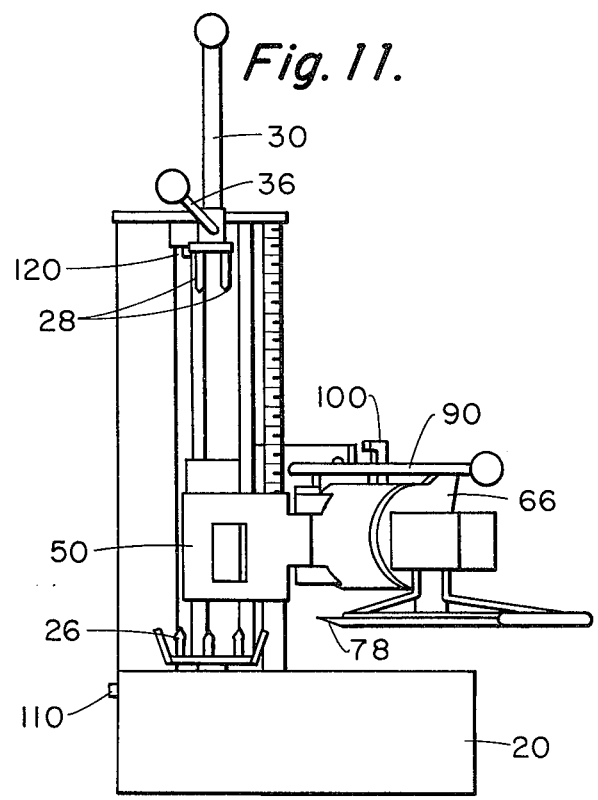

MEAT SLICER

BACKGROUND OF THE INVENTION

Spiral ham slicers are known in the art but they have significant disadvantages in that there is not sufficient selective manual control provided to guide the blade selectively in and out as it cuts around the difficult aitch bone of the ham. The present invention provides a simple, easily accessible mechanism for manual manipulation of the blade at the difficult portion of the cutting, while still allowing fully automatic slicing to take place once the aitch bone has been cleared.

BRIEF DESCRIPTION OF THE DRAWINGS

FIGS. 4 through 11 are partially schematic views showing eight steps in the cycle of operation of the ham slicer.

FIG. 12 is a fragmentary section taken on line 12—12 in FIG. 1.

FIG. 13 is a fragmentary section taken on line 13—13 in FIG. 12.

DETAILED DESCRIPTION OF THE EMBODIMENT OF THE INVENTION

Figure 1:
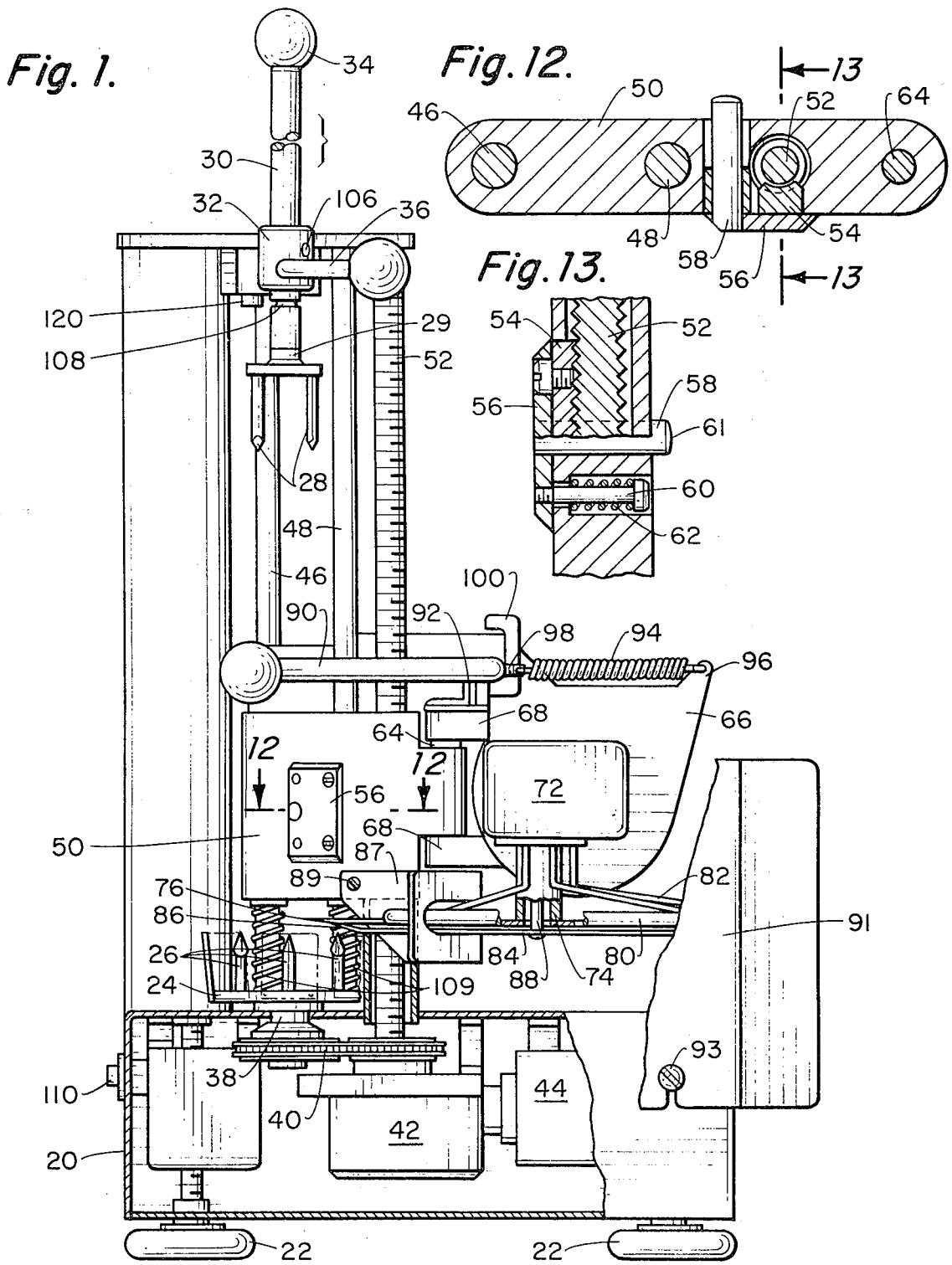
FIG. 1 is an elevation partly in section of the ham slicer of the present invention.

Referring to the drawings, the ham slicer comprises a stationary base 20 mounted on adjustable levelling legs 22. The base 20 is in the form of a shell beneath which are mounted the drive motor 44 and gearing 42 that rotate the ham. Atop the base 20 is rotatably mounted, on a vertical axis, a holder means in the form of a platform 24, having upwardly extending spikes 26 on which a ham may be impaled. The upper end of the ham is impaled by upper spikes 28 journaled at 29 on the end of a vertical shaft 30 adjustably held in a collar 32. The shaft 30 may be slid up and down in the collar 32 by means of a removable knob 34, and may be clamped against such vertical movement by a clamp 36. The holder platform 24 is mounted for rotation on a short vertical shaft 38 rotated via a drive chain 40 from the gear box 42, in turn driven by the electric motor 44.

Offset from the rotative axis of the platform 24 are a pair of stationary vertical guide rods 46 and 48 on which is slideably mounted a relatively thin, flat block 50 forming a carriage means for the blade support to be described. Paralleling the rods 46/48 and passing through a hole in the block 50 is a vertical lead screw 52 forming a drive means for the block. The lead screw 52 is rotated directly from the gear box 42, as seen in FIG. 1. The carriage block 50 is selectively coupled to the lead screw 52 by means of a fractional nut 54, secured to a mounting member consisting of a plate 56, in turn secured to a pair of guide pins 58 and 60 slideably mounted for reciprocation in the carriage block 50. The guide pin 58 extends all the way through the carriage block 50 and protrudes at the opposite side, as shown in FIG. 13, to form a nut-release button 61. The mounting member or plate 56 is biased inwardly by a compression spring 62, so that normally the fractional nut 54 is biased into engagement with the lead screw 52. It may be disengaged therefrom by pushing on the button 61, thereby retracting the fractional nut 54 away from the lead screw 52.

Pivotally mounted on the carriage block 50, by means of a vertical hinge pin 64, is a blade support means in the form of a frame 66, having trunnion brackets 68 journaled around the pin 64. Mounted in the blade support frame 66 is an electric drive motor 70, whose shaft extends horizontally into a gear box 72, from which protrudes downwardly a hollow driven shaft 74. On the lower end of the shaft 74 is mounted a blade means in the form of a circular cutting disk 76. The motors 44 and 70 are energized through circuitry controlled by a start button 110 and a stop button 111, adjacent thereto. When the motor 70 is energized, the blade 76 is rotated, and when brought into engagement with a ham 79 (FIGS. 4–10) mounted on the platform 24, effects a spiral cut as will be described hereinafter.

For protective purposes, an arcuate ring 80 is secured to the support frame 66 by means of radial arms 82. The ring 80 arcuately surrounds the exposed cutting edge of the blade 76 for protection of users.

As the blade 76 cuts into the ham, it has been found that on occasion the pressure of the freshly cut ham on the blade, causes the blade to throw out a chunk of ham. While this is not particularly objectionable, it has been found that at times it can be mitigated by a stationary circular paddle 84, the periphery of which bends upward as shown at 86 into contact with the blade 76 just short of its peripheral cutting edge. The circular paddle 84 is held by a stationary shaft 88 extending downwardly through the hollow rotating shaft 74 of the gear box 72. A deflector 87 attached to the carriage block 50 by means of screws 89 confines any meat chips or chunks that might be thrown out in the cutting operation. A shield 91 secured to the base 20 gives further protection to the operator. It is readily removable from the base 20 by virtue of the slot and screw attachments shown at 93.

Figure 3:
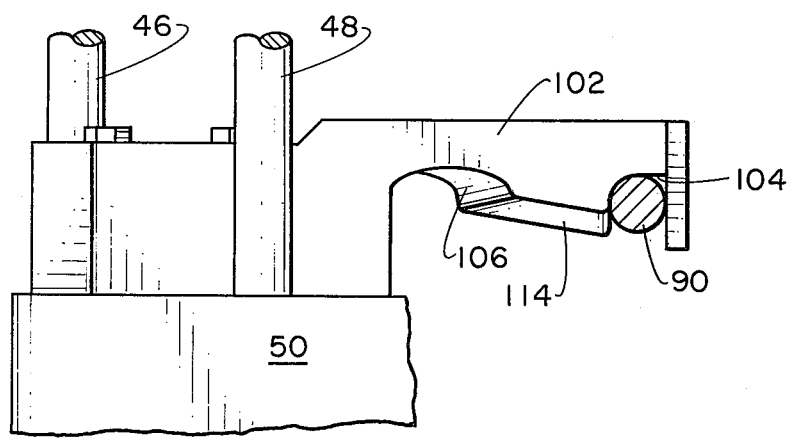
FIG. 3 is a fragmentary section taken on line 3-3 in FIG. 2.

Control of the blade support frame 66 is provided by a manually manipulatable arm 90, mounted to a small angular bracket 92, which is in turn pivotally mounted on the vertical hinge pin 64. The arm 90 thus pivots both with respect to the carriage block 50 and the blade support frame 66. A biasing means in the form of a tension spring 94 is extended between one corner 96 of the blade support frame 66 and an adjustable mounting screw 98 passing through the arm 90. On the end of screw 98 is threaded a nut 99. By this installation the spring 94 is fully exposed for cleaning and readily adjustable by nut 99, so that the biasing force pressing the blade 76 against the cut of meat 79 mounted on the holder 24 may be easily and readily adjusted. The spring 94 thus biases the arm 90 toward the blade support frame 66 and into abutment with a stop member 100 secured to the frame 66. The inner end of the arm 90 slides in a stationary bracket 102, having a pair of notched detents 104 and 106 (FIG. 3). The arm 90 is pivotally mounted to the angle bracket 92 by a horizontal pivot pin, so that the arm may be pivoted up and down and thus selectively detented in and out of the detents 104 and 106.

Figure 2:
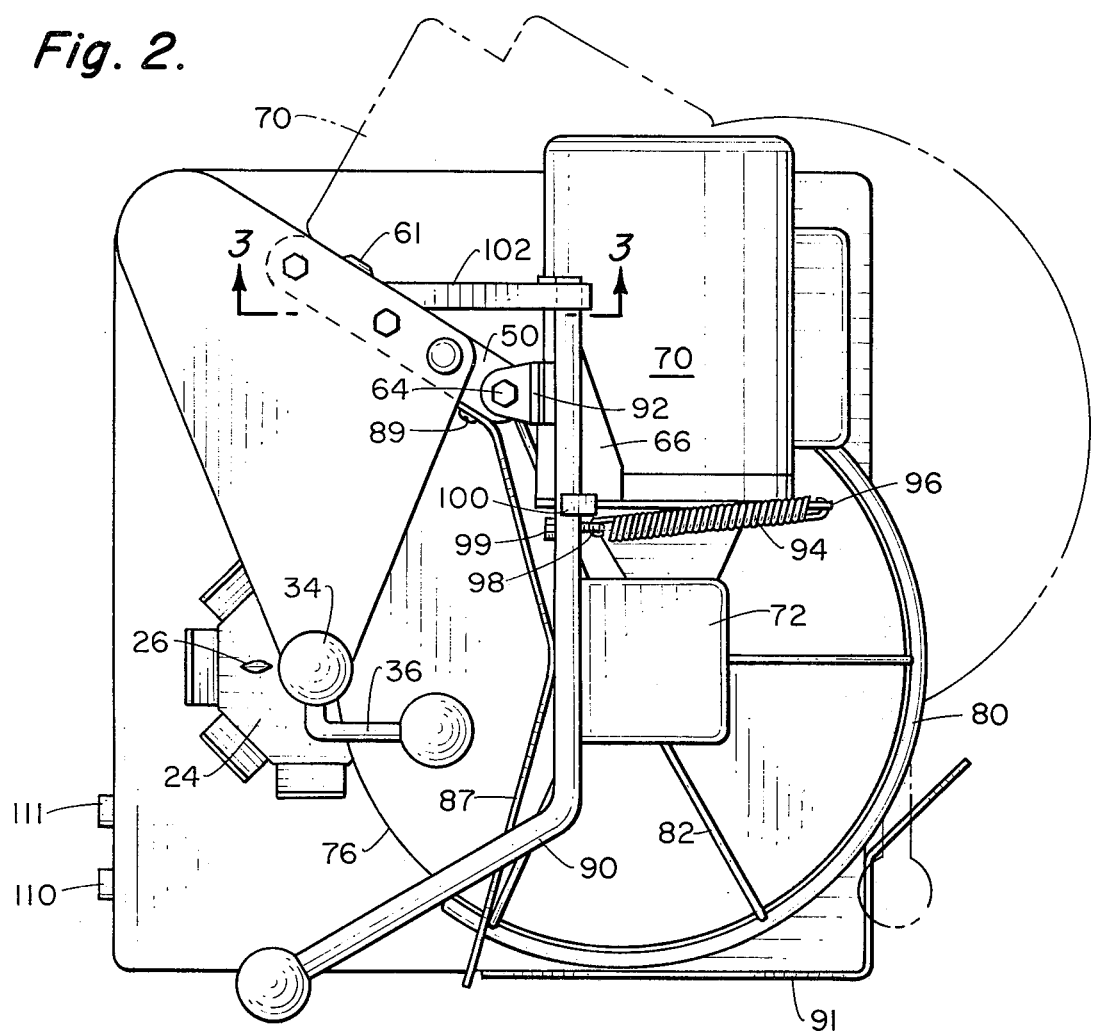
FIG. 2 is a plan view.

When the blade support frame 66 is swung completely away from the ham 79, to the position shown in phantom lines in FIG. 2, the side of the frame 66 engages the button 61, pushing it to the left in FIG. 13, and causing the fractional nut 54 to disengage from the lead screw 52. This allows the carriage block 50 to slide down on the guide rods 46 and 48. The carriage 50 is countersprung by a pair of compression springs 108 which tend to counter the weight of the assembly including the carriage block 50, motor frame 66, motor 70, and blade assembly 76.

The relatively simple and easily accessible nature of the components of the slicer makes it very easy to clean and maintain. For example, the upper holder shaft 30 with prongs 28 may be easily cleaned simply by unscrewing the knob 34, loosening the clamp 36, and sliding the shaft 30 downward through the collar 32, so that it may be completely removed from the machine for cleaning.

OPERATION

In use the clamp 36 is loosened and the shaft 30 is slid upwardly by the knob 34. It remains conveniently in this position by a spring pressed detent 107 which engages a detent groove 109 on the shaft 30. The ham 79 is then impaled on the spikes or prongs 26 on the platform 24, and the prongs 28 on shaft 30 are pressed downwardly into the top of the ham. (Note FIGS. 4–10).

Before this operation the arm 90 has been swung to its extreme counterclockwise position (FIG. 2, phantom), away from the ham 79, and detented into position by engagement by the end of the arm 90 in the detent 106.

In this position the carriage block 50 is disengaged from the lead screw 52 by virtue of the engagement of the frame 66 against the button 61, as shown in phantom in FIG. 2. The weight of the carriage assembly therefore has placed the carriage at the bottom of the guides 46/48, against the bias of the countersprings 109. This is the position shown in FIG. 4. The start button 110 is then pressed, starting the motors 44 and 70. This causes the blade 76, the ham 79, and the lead screw 52 to rotate. The arm 90 is then released manually from the detent 106 and moved clockwise (FIG. 2). Freeing of the button 61 allows the spring 62 to effect engagement between the fractional nut 54 and the rotating lead screw 52. Thereupon the carriage block 50 starts to rise. The operator now manipulates the arm 90 in and out, causing the blade 76 to travel selectively around the contour of the aitch bone 113, as shown in FIG. 5. In the course of this manipulation the end of the arm 90 slides back and forth along the sloping underface 114 of the detent member 102 (FIG. 3). While the arm 90 is bearing against the stop 100, there is a rigid relationship between the arm 90 and the blade support frame 66 that is in the retracting direction of movement of arm 90. In the forward or meat-engaging direction of arm 90, the engagement between the arm 90 and the frame 66 is resilient, by virtue of the spring 94. Thus, in the manual manipulation of the blade around the awkward aitch bone 113, the force which the operator is capable of applying from the arm 90 to the blade 76 is limited by the stress developable in the spring 94. Hence, while the operator may relieve the force against the bone during the cutting operation, he may never exceed the force of the tension developed in spring 94.

After the irregular aitch bone 113 of the ham 79 has been cleared, the arm 90 is moved to its maximum clockwise position and detented into the detent 104. Thereafter control of the disk blade 76 is under the biasing spring 94, which biases the blade 76 with sufficient force to cause it to press inwardly on the ham 79 and against the main bone 116 (FIG. 6). As the assembly steadily rises under the drive of the lead screw 52, (FIG. 7) the support frame 66 oscillates back and forth under the bias of the spring 94, which keeps the blade 76 pressed against the bone 116.

When the assembly reaches the position shown in FIG. 8, the operator depresses the manual stop button 111, which turns off both of the motors 44 and 70. In case the operation is inadvertently allowed to go beyond this point, the carriage block 50 will come into engagement with a stop button 120, connected in series with the manual stop button 111, and this will also turn off both of the motors 44 and 70. The operator then retracts the blade, as shown in FIG. 9, and when the blade support frame 66 attains its extreme counterclockwise position (shown in phantom in FIG. 2) it engages the button 61, freeing the fractional nut 54 from the lead screw 52. The assembly now drops by gravity to the starting position, as shown in FIG. 10. Thereafter, clamp 36 is released, and the shaft 30 is raised and held in raised position by the detent 106. The ham 79 is then removed from the prongs 26 and 28, leaving the apparatus as shown in FIG. 11.

Whereas the present invention has been shown and described herein in what is conceived to be the best mode contemplated, it is recognized that departures may be made therefrom within the scope of the invention which is therefore not to be limited to the details disclosed herein but is to be afforded the full scope of the invention.

What is claimed is:

1. In a meat slicer having holder means for rotatably mounting a cut of meat,
   carriage means,
   drive means for effectuating relative movement between said holder means and said carriage means in a direction paralleling the rotative axis of said holder means,
   blade support means pivotally mounted on said carriage means for rotation about an axis parallel to said rotative axis of said holder means,
   blade means mounted on said support means and movable therewith toward and away from said holder means axis upon pivoting of said support means,
   a manually manipulatable arm pivotally mounted to said carriage means,
   stop means on said support means engagable by said arm,
   biasing means connecting said manipulatable arm to said support means for biasing said arm toward said stop means,
   whereby said blade means may be selectively moved toward and away from said holder means axis by arcuately manipulating said arm, the force which the arm is capable of applying to said blade means in the direction of said holder means axis being limited by the stress developable in said biasing means.

2. The meat slicer of claim 1 wherein:
   said blade means comprises a disk blade and a motor for rotating said blade.

3. The meat slicer of claim 1 wherein:
   said drive means comprises a lead screw and a fractional nut selectively engageable with said lead screw,
   a mounting member carrying said nut and movably mounted on said carriage means, and engageable by said blade support means to disengage said nut from said screw.

4. The meat slicer of claim 1 wherein:

said blade support means and said arm are pivoted on a common axis.

5. The meat slicer of claim 1 wherein:
said pivotal mounting of said arm is effected via a bracket pivoted on said common axis,
said arm being mounted to said bracket for pivoting on a second axis perpendicular to said common axis,
means for detenting said arm into either of two positions, at the respective ends of said arcuate manipulation, by the pivoting of said arm about said second axis.

6. In a meat slicer having holder means for mounting a cut of meat,
carriage means mounted for linear movement with respect to said holder means,
a lead screw for driving said carriage means,
said carriage means having nut means selectively engageable with said lead screw to cause said lead screw to drive said carriage means,
the improvement comprising:
blade support means having blade means and being movably mounted on said carriage means to move said blade means into and out of engagement with a cut of meat mounted on said holder means,
nut actuating means engageable by said blade support means when said blade support means is disengaged from the meat, to disengage said nut means from said lead screw,
whereby said carriage means may move independently of said lead screw.

7. The meat slicer of claim 6 wherein:
said nut actuating means is fixed to said nut means and is movably mounted on said carriage means, and is engaged by said blade support means when the latter is moved to its extreme position out of engagement with the cut of meat.

8. In a meat slicer having holder means for rotatably mounting a cut of meat,
carriage means,
drive means for effecting relative movement between said holder means and said carriage means in a direction paralleling the rotative axis of said holder means,
blade support means pivotally mounted on said carriage means for rotation about an axis parallel to said rotative axis of said holder means,
blade means mounted on said support means and movable therewith toward and away from said holder means axis upon pivoting of said support means,
the improvement comprising:
a manually manipulatable arm pivotally mounted to said carriage means,
a spring connected between said arm and said support means, so that when stressed it urges said blade means against a cut of meat mounted in said holder means,
whereby said blade means may be selectively moved toward and away from said holder means axis by arcuately manipulating said arm, the force which the arm is capable of applying to said blade means in the direction of said holder means axis being limited by the stress developable in said spring.

9. The meat slicer of claim 8, wherein:
said blade support means and said arm are pivoted on a common axis.

10. The meat slicer of claim 9, wherein:
said spring is a tension spring tensioned between said arm and said support means and having a substantial force component tangential to said common axis.

* * * * *